United States Patent
Li et al.

(10) Patent No.: US 12,001,828 B2
(45) Date of Patent: *Jun. 4, 2024

(54) AUTOMATIC SELF-ADJUSTING SOFTWARE IMAGE RECOMMENDATION

(71) Applicant: VMware, Inc., Palo Alto, CA (US)

(72) Inventors: Hui Li, Fremont, CA (US); Mukund Gunti, Sunnyvale, CA (US); Yuedong Mu, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 17/124,046

(22) Filed: Dec. 16, 2020

(65) Prior Publication Data

US 2022/0188091 A1 Jun. 16, 2022

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45562* (2013.01); *G06F 2009/4557* (2013.01)

(58) Field of Classification Search
CPC ............... G06F 8/65; G06F 9/45558; G06F 2009/45562; G06F 2009/4557
See application file for complete search history.

(56) References Cited

U.S. PATENT DOCUMENTS

| | | | | |
|---|---|---|---|---|
| 9,898,354 | B2* | 2/2018 | Engel | G06F 9/44536 |
| 11,194,561 | B1 | 12/2021 | Li et al. | |
| 2011/0296156 | A1* | 12/2011 | Dandekar | G06F 9/45533 |
| | | | | 713/2 |
| 2013/0086578 | A1* | 4/2013 | Eilam | G06F 9/45558 |
| | | | | 718/1 |
| 2018/0060588 | A1* | 3/2018 | Shaposhnik | G06F 21/57 |
| 2018/0349130 | A1* | 12/2018 | Mohammed | H04L 41/40 |
| 2020/0394049 | A1* | 12/2020 | Eder | G06F 9/45558 |

OTHER PUBLICATIONS

U.S. Appl. No. 16/923,820, filed Jul. 8, 2020.

* cited by examiner

*Primary Examiner* — Jacob D Dascomb
(74) *Attorney, Agent, or Firm* — Kim & Stewart LLP

(57) ABSTRACT

A method of updating a desired state of a virtualization software for a cluster of hosts includes: in response to a notification of a change associated with the cluster, determining versions of a base image of the virtualization software that are compatible with the cluster; for each compatible version of the base image, determining versions of an add-on image of the virtualization software that are compatible with the compatible version of the base image and the cluster; presenting as a recommended image a complete image of the virtualization software, the complete image containing a first version of the base image that is compatible with the cluster and a first version of the add-on image that is compatible with the first version of the base image and the cluster; and upon acceptance of the recommended image, updating a software specification to include the recommended image.

20 Claims, 12 Drawing Sheets

AUTOMATIC SELF-ADJUSTING SOFTWARE IMAGE RECOMMENDATION

BACKGROUND

In many virtualized computing systems, virtualization software is installed on a cluster of hosts from an ISO image created from a flat list of software installation bundles (SIBs). SIBs are the smallest units of software that can be shipped and installed. SIBs can make up, for example, base hypervisor images (hereinafter referred to as "base images") from virtualization software providers. SIBs can also make up drivers, agents, and other software components from original equipment manufacturers (OEMs) and other hardware vendors. In a typical installation, hundreds of SIBs are packaged into one or more ISO images and installed in hosts.

After installation, lifecycle management of virtualization software becomes cumbersome and error-prone for several reasons. Firstly, although different software developers create new versions or updates to SIBs, new versions or updates cannot be released independently. The releases must be tightly controlled because it is likely that one SIB has a dependency on another SIB. As a result, new releases may be made in the form of bulletins, which are collections of SIBs. New releases may also be made in the form of new ISO images. Either way, new SIBs from a virtualization software provider, an OEM, and other software vendors are packaged together. Because of the interdependencies and the integration of newly developed SIBs with other SIBs, it is difficult to make piecemeal changes to a virtualization software for consumption by an end user during the lifecycle of the virtualization software.

Furthermore, new releases come in many different forms. For example, a complete release such as a general availability (GA) release may be made with either a bulletin or an ISO image. A partial release such as a rollup, patch, update, or extension may be made with a bulletin. Most end users of virtualization software do not understand the differences among these different types of partial releases, and there are no clear rules establishing when and how to create a bulletin for a particular type of release.

Consequently, over time, changes to a virtualization software are layered on top of each other, and the complete image of the virtualization software is not easily captured or described. History also becomes problematic because past bulletins may have included SIBs that are not overridden by later bulletins. For these reasons, end users are often unable to answer the question: "What is the current state of the virtualization software configured in each host in a cluster?" If an end user desires a particular state of a virtualization software, the end user may have no way of determining whether the current state is compliant with the desired state and, if not, how to make the current state compliant.

It is also difficult for end users to manage software that can be enabled to provide discrete features and functionalities (referred to herein as "solutions"). The management requires knowledge of potential conflicts between enabled solutions and the underlying virtualization software. Even when the proper versions of enabled solutions are installed, the enabled solutions might become incompatible and break at a later time when the underlying virtualization software is upgraded. As a result, upgrading the virtualization software might require multiple maintenance windows and reboots.

As disclosed in U.S. patent application Ser. No. 16/923,820, filed Jul. 8, 2020, the entire contents of which are incorporated by reference herein, a recommendation engine within a desired state model may be implemented for offering pre-validated virtualization software image states to an end user for a cluster of hosts. Such recommendation ensures that a combination of software components does not violate any interdependencies or conflicts. Such recommendations also ensure compatibility between software components, the hardware platforms of hosts, and firmware.

Furthermore, various conditions involving a cluster may change after the recommendation engine generates a recommendation, and in such situations, previously generated recommendations may become stale. For example, the addition of a hardware component to a host may invalidate a prior recommendation because of the creation of a new dependency that violates the recommendation.

SUMMARY

One or more embodiments provide a recommendation engine that subscribes to various changes in a virtual computing environment that may invalidate prior recommendations and automatically responds to such changes to generate updated recommendations.

In one embodiment, a method of updating a desired state of a virtualization software to be installed in a cluster of hosts, wherein the virtualization software includes at least a base image and an add-on image, includes the steps of: in response to a notification of a change associated with the cluster, determining versions of the base image that are compatible with the cluster; for each compatible version of the base image, determining versions of the add-on image that are compatible with the compatible version of the base image and the cluster; presenting as a recommended image a complete image of the virtualization software, the complete image containing a first version of the base image that is compatible with the cluster and a first version of the add-on image that is compatible with the first version of the base image and the cluster; and upon acceptance of the recommended image, updating a software specification to include the recommended image, the software specification expressing the desired state of the virtualization software.

Further embodiments include a non-transitory computer-readable storage medium comprising instructions that cause a computer system to carry out the above method, as well as a computer system configured to carry out the above method.

DETAILED DESCRIPTION

Figure 1:
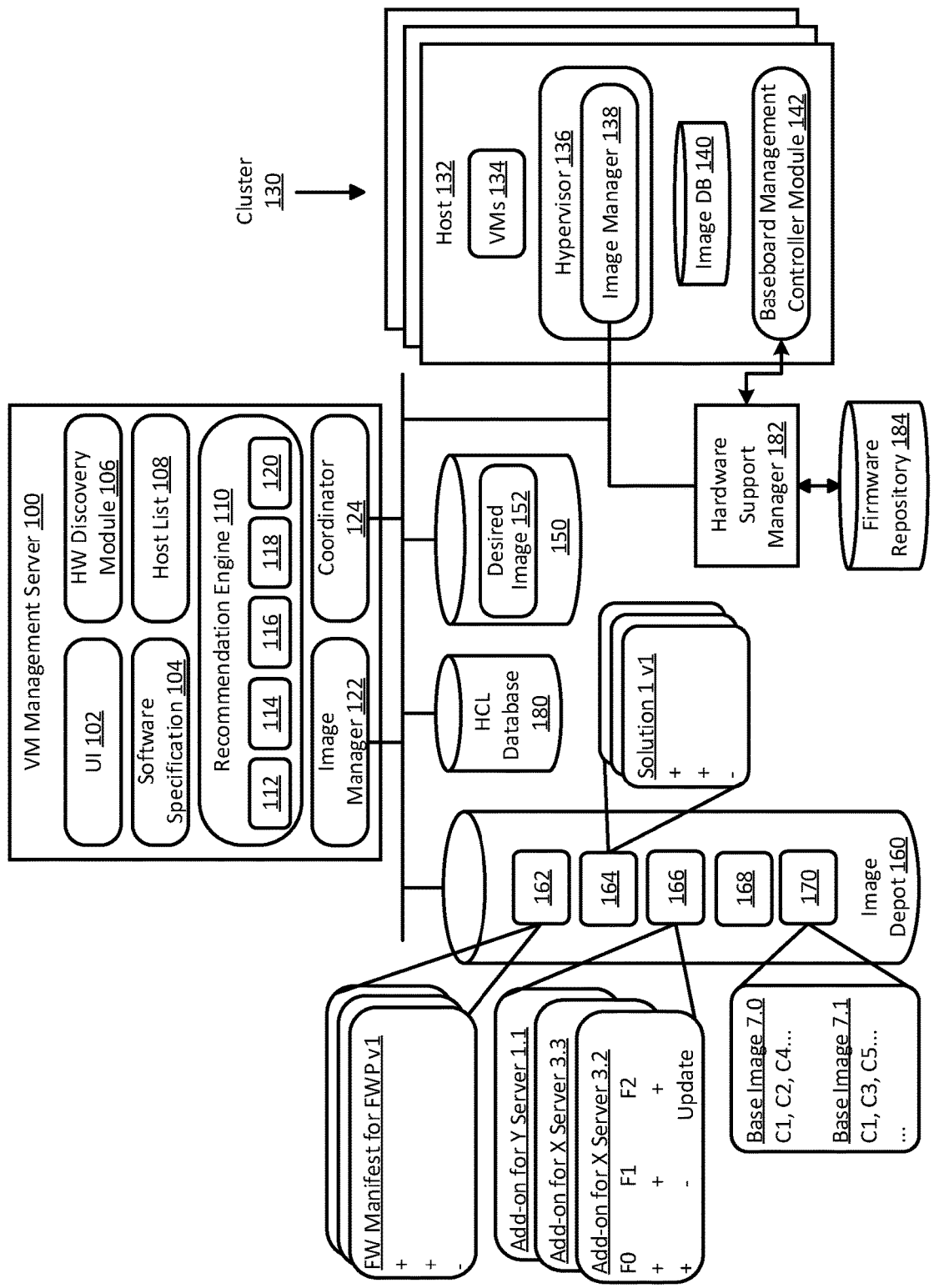
FIG. 1 is a block diagram of a virtualized computing system that implements a desired state model for managing the lifecycle of a virtualization software and for automatically updating a recommended state of the virtualization software, according to embodiments.

According to embodiments, SIBs, more generally referred to herein as "payloads," are logically grouped into "components." A component is a unit of shipment and installation, and a successful installation of a component typically appears to an end user as enabling a specific feature. For example, to ship a user-visible feature that requires a plug-in, a driver, and an agent, a software vendor creates separate payloads for each of the plug-in, the driver, and the agent. The software vendor then groups the separate payloads together as one component. From the end user's perspective, installing the component onto a server is sufficient to enable the feature on the server. A component may be part of another software image, such as a base image or an add-on. A component may otherwise be a stand-alone component provided by a third-party or by the end user (hereinafter referred to as a "user component").

As used herein, a "base image" is a collection of components that are sufficient for booting up a server with a virtualization software. A base image includes a core kernel component and components for both basic and in-box drivers. The core kernel component comprises a kernel payload and other payloads that have interdependencies with the kernel payload. The collection of components that make up the base image is packaged and released as one unit.

As used herein, an "add-on" or "add-on image" is a collection of components that an OEM combines to customize its servers. Using add-ons, an OEM can add, remove, or update components in the base image. An add-on is layered on top of a base image, the combination including all the components necessary to boot up, monitor, and customize an OEM's servers. Although an add-on is layered on top of a base image, the add-on content and the base image content are not tied together. An OEM can thus independently manage the lifecycle of its releases, and end users can update add-ons and base images independently of each other.

As used herein, "solutions" are software that provide end users with discrete features and functionalities. An example of a solution is "high availability" (HA), which provides failover protection against hardware and system software outages within a cluster of hosts. Another example is "virtual center" (VC), which provides various tools for managing virtual machines (VMs) running in a cluster. Another example is a "virtual network" (e.g., VMware NSX®), which VMs running in a cluster can connect to. Another example is a "virtual storage area network" (VSAN), which allow an end user to provision virtual storage resources from local hard disk drives (HDDs) and/or solid-state drives (SSDs) of individual hosts. Solutions run independently of a virtualization software image, but solutions require the image to comprise certain components, hereinafter referred to as "solution components." In the embodiments, an end user can enable a solution in a user interface without deciding which solution components to install. Instead, after a solution has been enabled by the end user, an image manager (described below) determines which solution components to install based on the solution's constraints.

FIG. 1 is a block diagram of a virtualized computing system that implements a desired state model for managing the lifecycle of a virtualization software and for automatically updating a recommended state of the virtualization software, according to embodiments. The virtualized computing system includes a VM management server 100, a cluster 130 of hosts 132, a shared storage 150, an image depot 160, a hardware compatibility list (HCL) database 180, and a hardware support manager 182.

Hosts 132 may be constructed on server grade hardware platforms such as x86 architecture platforms. The hardware platforms include one or more central processing units (CPUs), system memory such as random-access memory (RAM), and one or more network interface controllers (NICs). A virtualization software layer, also referred to herein as a hypervisor 136, is installed on top of each hardware platform. Hypervisor 136 supports a VM execution space for concurrently instantiating and executing multiple VMs 134.

Hosts 132 access shared storage 150 through their NICs. In another embodiment, each host 132 contains a host bus adapter (HBA) for sending input/output operations (IOs) to shared storage 150. Shared storage 150 may comprise, e.g., magnetic disks or flash memory in a storage area network (SAN). In other embodiments, hosts 132 also contain local storage devices, such as HDDs or SSDs, which may be aggregated and provisioned as a VSAN device.

VM management server 100 is a physical or virtual server that communicates with the hypervisor 136 of each host 132 to provision VMs 134 from hardware resources. VM management server 100 logically groups hosts 132 into a cluster 130 to provide cluster-level functions. Such functions include load balancing between hosts 132 through VM migrations, dynamic VM placements according to affinity and anti-affinity rules, distributed power management, and HA. The number of hosts 132 in cluster 130 may be one or many, and the number of clusters 130 may also be one or many even though only one cluster 130 is depicted in FIG. 1.

In the desired state model, an end user can manually express a desired state of virtualization software through a user interface (UI) 102. VM management server 100 stores the end user's selections for the desired state in software specification 104. The end user's selections include (1) a base image, (2) an add-on, (3) a firmware package, (4) solutions, and (5) user components. In accordance with the method of FIG. 2, an image manager 122 in VM management server 100 uses software specification 104 to composite a desired image that is modeled as a hierarchical software stack. The software stack includes (1) the base image at the bottom layer of the stack, (2) the add-on layered on top of the base image, (3) a firmware manifest corresponding to the selected firmware package layered on top of the add-on, and (4) solution components and user components layered on top of the firmware manifest.

Metadata of solutions and user components are published in image depot 160. Metadata of base images, add-ons, and firmware packages are also published in image depot 160. Payloads of all of the components are also published in image depot 160.

As depicted in FIG. 1, base image metadata 170 includes metadata for a Base Image 7.0, which includes components C1, C2, C4, etc., metadata for a Base Image 7.1, which includes components C1, C3, C5, etc., and additional base images.

Add-on metadata 166 includes metadata for a family of servers F0, F1, and F2, in which "+" represents a component being added to a base image, "−" represents a component being removed from a base image, and "Update" represents a component in the base image being updated. As depicted in add-on metadata 166, for each family of servers, different components can be added to, removed from, and updated in a base image. Different add-ons can thus have different dependencies.

Firmware package metadata 162 specifies components to add on top of an add-on (depicted by a "+") and components to remove (depicted by a "−"). Drivers, agents, and other software components corresponding to a selected firmware package thus become part of a virtualization software image.

Solution metadata 164 specifies solution components to add on top of a firmware package (depicted with a "+") and solution components to remove (depicted with a "−"). User component metadata 168 specifies user components to also add on top of a firmware package. In alternative embodiments, OEMs set up separate depots, e.g., in the form of file servers, to store metadata and payloads of components that the OEMs publish.

Figure 3:
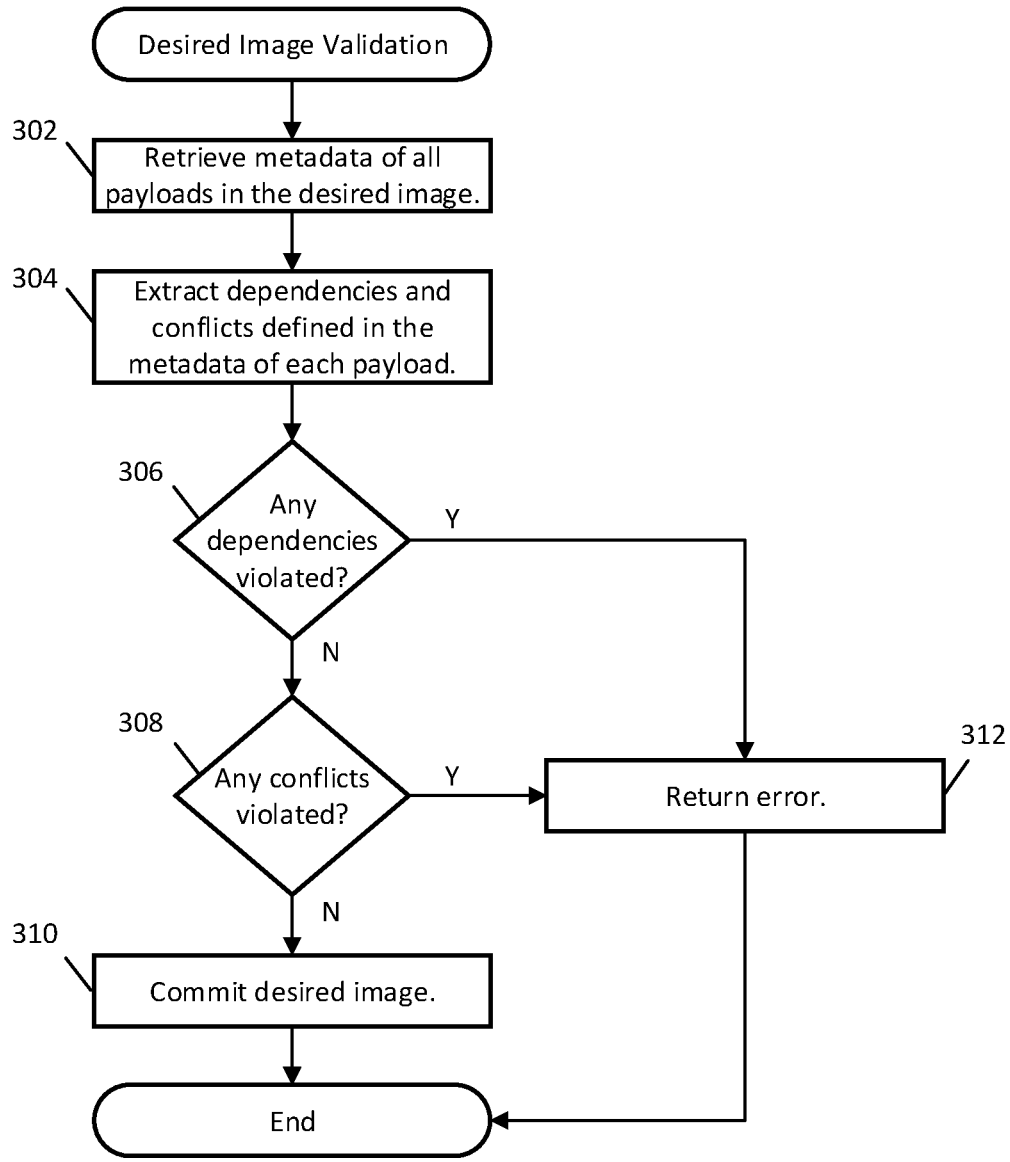
FIG. 3 is a flow diagram of steps carried out by an image manager to perform a software validation of a desired virtualization software image, according to an embodiment.

In accordance with the method of FIG. 3, after image manager 122 composites a virtualization software image from software specification 104, image manager 122 can perform a software validation of the composited image. If valid, image manager 122 stores the image in shared storage 150 as a desired image 152. Desired image 152 is a complete virtualization software image that is to be installed in hosts 132 upon successful HCL validation (discussed below). A coordinator 124 in VM management server 100 communicates with the image manager 138 of each hypervisor 136 through an API call to install desired image 152 in each host 132. Once an image manager 138 installs a desired image 152, it stores the installed image's metadata in an image database 140. Each image database 140 operates as the single source of truth for the state of the virtualization software configured in its host 132. Image database 140 is also updated with any changes to the state of the virtualization software.

Hardware support manager 182 is a physical or virtual server exposing various APIs and containing a firmware management software. The exposed APIs include: (1) an "apply/remediate" API call to install the firmware specified by desired image 152 in hosts 132 or to remediate the firmware currently installed in hosts 132, (2) a "list" API call to list all the firmware packages supported by hardware support manager 182, (3) a "scan" API call to compare the current state of the firmware running in hosts 132 with the firmware specified by desired image 152, (4) a "firmware inventory" API call to report the current state of the firmware running in hosts 132, (5) a "pre-check" API call to confirm that it is possible to upgrade the firmware currently installed in hosts 132 to the firmware specified by desired image 152, and (6) a "stage" API call to retrieve the firmware specified by desired image 152 and store them in a cache memory of hosts 132 for installation upon receipt of an apply/remediate API call. Using these APIs, the end user can manage the virtualization software image installed in hosts 132 and the firmware installed in hosts 132 from a single "pane of glass," UI 102 being the single pane of glass in the embodiment of FIG. 1.

To install firmware in hosts 132, coordinator 124 communicates with hardware support manager 182 through an API call. In response to the API call, hardware support manager 182 retrieves the firmware from a firmware repository 184 and stages the firmware in hosts 132. A baseboard management controller (BMC) module 142 in each host 132 then installs the staged firmware in its host 132. Examples of BMC modules 142 include HPE's Integrated Lights-Out (iLO) and Dell's Integrated Dell Remote Access Controller (iDRAC). A BMC module 142 also detects when various events occur within its host 132, including the addition to or removal of a hardware device or the updating of a device driver or of firmware.

Figure 4:
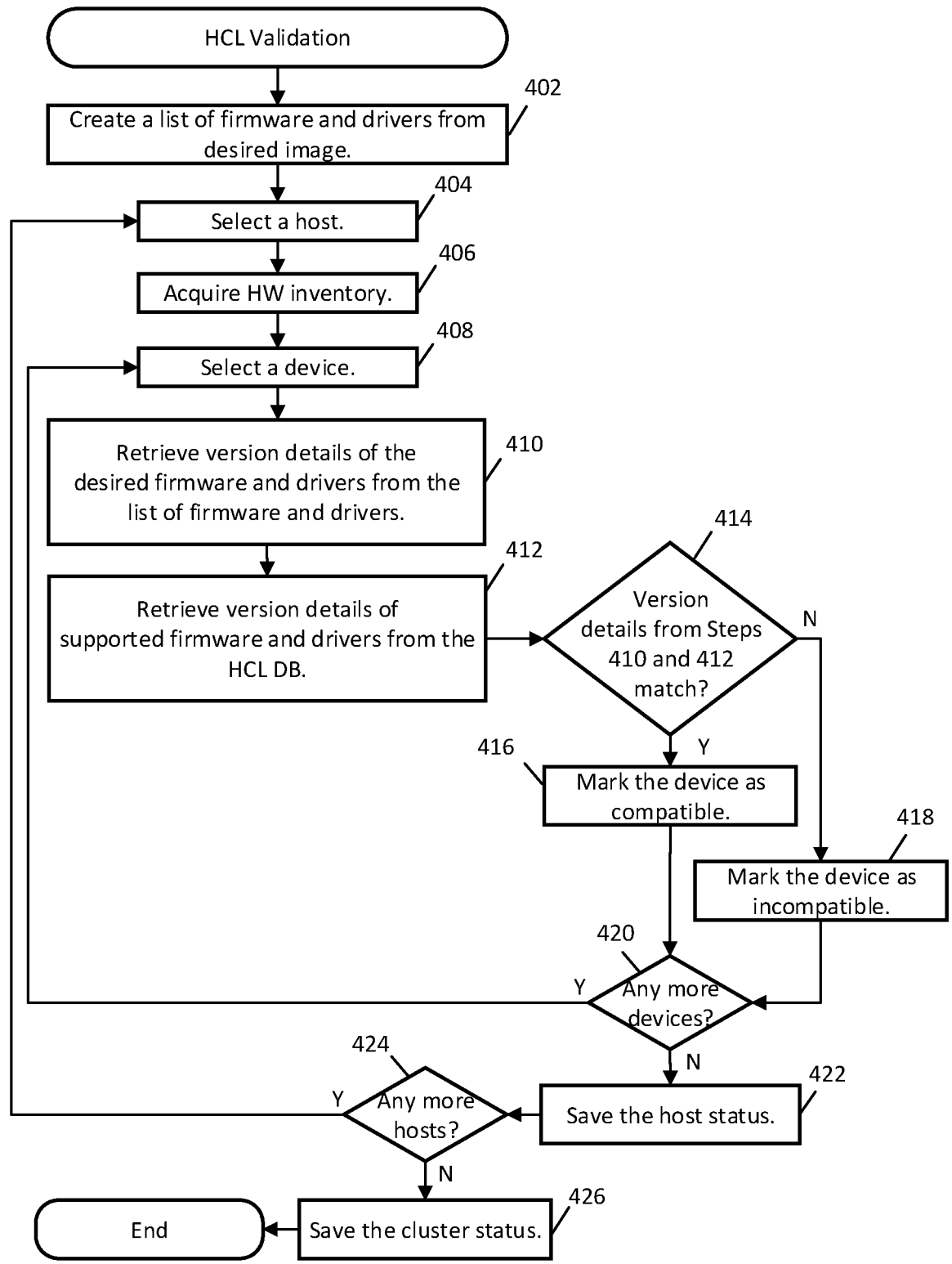
FIG. 4 is a flow diagram of steps carried out by an image manager to perform a validation of a desired virtualization software image against the compatibility rules of a hardware compatibility database, according to an embodiment.

In accordance with the method of FIG. 4, before installation of desired image 152 in hosts 132, image manager 122 performs a validation against HCL database 180. The goal of this validation, more specifically referred to herein as HCL validation, is to ensure that desired image 152 is compatible with the hardware devices in all the hosts 132 of cluster 130. HCL database 180 contains a list of all hardware devices installed in hosts 132 and identifies, for each hardware device, all versions of device firmware and drivers that are compatible therewith, i.e., compatibility rules. HCL validation is successful if the versions of the firmware and drivers in desired image 152 are listed in HCL database 180 as compatible versions. Otherwise, HCL validation is unsuccessful, and desired image 152 is not installed in any host 132.

A hardware discovery module 106 in VM management server 100 executes a program to provide hardware discovery service. As part of the hardware discovery service, hardware discovery module 106 stores and maintains a list of hosts 132 of cluster 130 in a host list 108.

To make recommendations, recommendation engine 110 examines desired image 152 and evaluates different combinations of base images, add-ons, firmware packages, solutions, and user components for possible recommendation. Recommendation engine 110 automatically generates a new recommendation upon the occurrence of various change events. Such change events include: (1) hardware devices being added to or removed from hosts 132, (2) drivers or firmware being updated in hosts 132, (3) a change being made to desired image 152, (4) a change being made to metadata in image depot 160, (5) a change being made to HCL database 180, or (6) a host 132 being added to or removed from cluster 130. If the end user accepts a recommendation, recommendation engine 110 updates desired image 152 accordingly. Recommendation engine 110 communicates with hardware discovery module 106 and image manager 122 to subscribe to such change events. Recommendation engine 110 is notified of the change events as described below in conjunction with FIGS. 5-9.

In the embodiments described herein, recommendation engine 110 includes a base image filter 112, an add-on filter 114, a firmware filter 116, a solution/user component filter 118, and a complete image filter 120. Base image filter 112 determines which base images available in image depot 160 are compatible with the hardware platforms of hosts 132. Add-on filter 114 determines which add-ons available in image depot 160 are compatible with the hardware platforms of hosts 132 and the base images selected by base image filter 112. Firmware filter 116 determines which firmware packages available in image depot 160 are compatible with the hardware platforms of hosts 132, the base images selected by base image filter 112, and the add-ons selected by add-on filter 114. Solution/user component filter 118 determines which solutions and user components available in image depot 160 are compatible with the hardware platforms of hosts 132, the base images selected by base image filter 112, the add-ons selected by add-on filter 114, and the firmware packages selected by firmware filter 116. Complete image filter 120 performs software validation and HCL validation of complete virtualization software images. The use of filters by recommendation engine 110 to generate pre-validated combinations of base images, add-ons, firmware packages, solutions, and user components for possible recommendation is described below in conjunction with FIGS. 10-12.

Figure 2:
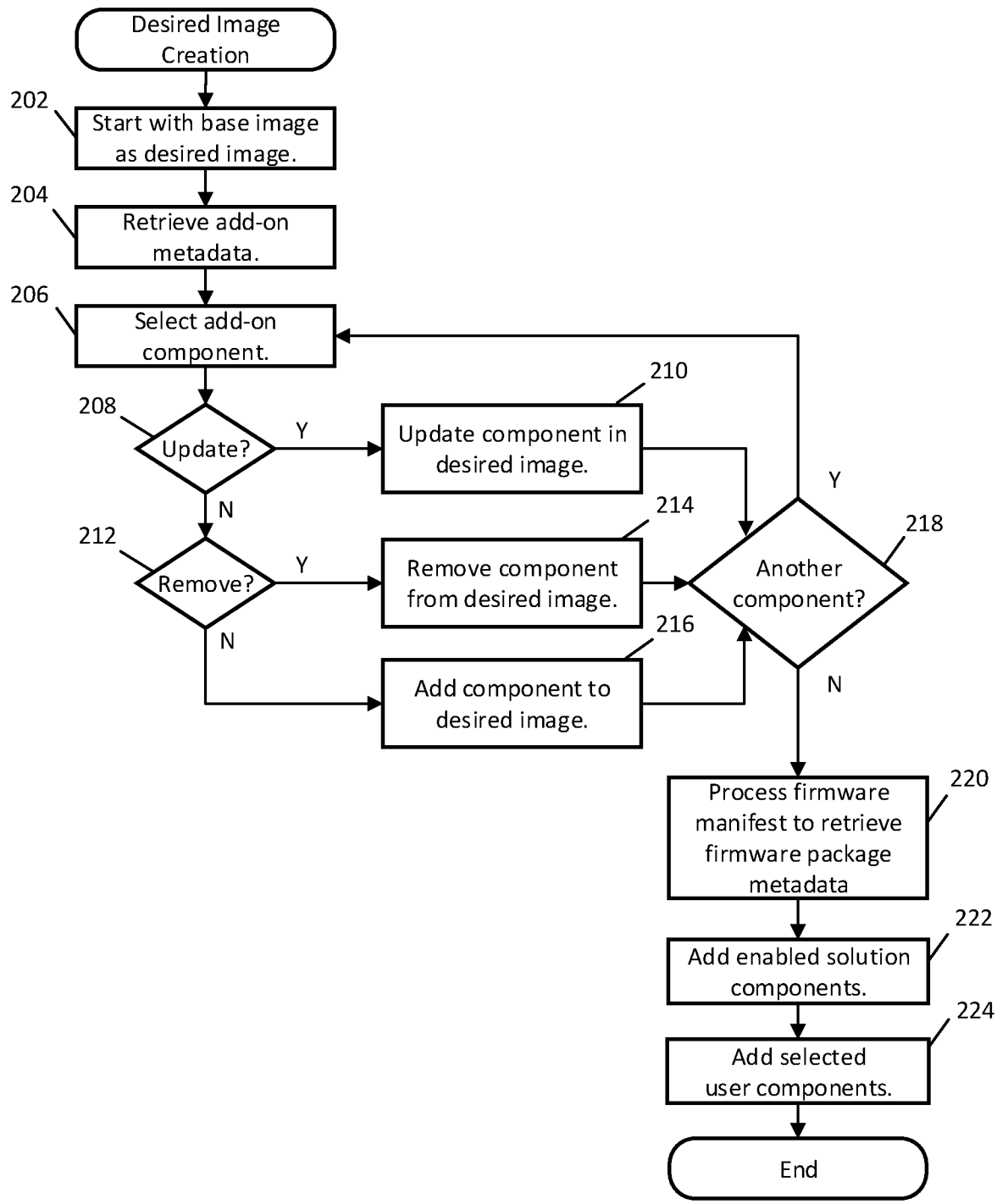
FIG. 2 is a flow diagram of steps carried out by an image manager to create a desired virtualization software image, according to an embodiment.

FIG. 2 is a flow diagram of steps carried out by image manager 122 to create a desired virtualization software image, according to an embodiment. The method of FIG. 2 begins at step 202, at which image manager 122 starts with the metadata of a selected base image as the desired image. At step 204, image manager 122 retrieves the metadata of a selected add-on and parses the metadata of the selected add-on for components.

At step 206, image manager 122 selects an add-on component to process. If the component is to be updated, as determined at step 208, then the method of FIG. 2 moves to step 210, and image manager 122 updates the metadata of the component in the desired image. If the component is not to be updated, then the method of FIG. 2 instead moves to step 212. If the component is to be removed, as determined at step 212, then the method of FIG. 2 moves to step 214, and image manager 122 removes the metadata of the component from the desired image. If the component is to be neither updated nor removed, then the method of FIG. 2 instead moves to step 216, and image manager 122 adds the metadata of the component to the desired image. If there are any more add-on components to process, as determined at step 218, then the method of FIG. 2 returns to step 206, and image manager 122 selects another component for processing. Otherwise, if there are no more add-on components to process, then the method of FIG. 2 moves to step 220.

At step 220, image manager 122 processes a selected firmware package's firmware manifest to add and remove firmware components in the same manner as for the add-on components. At step 222, image manager 122 adds one or more solution components for enabled solutions to the desired image. At step 224, image manager 122 adds one or more user components selected by the end user to the desired image. After step 224, the method of FIG. 2 ends.

FIG. 3 is a flow diagram of steps carried out by image manager 122 to perform a software validation of a desired virtualization software image, according to an embodiment. The method of FIG. 3 begins at step 302, at which image manager 122 retrieves the metadata of all the payloads in the desired image. At step 304, image manager 122 parses the retrieved metadata to extract all the dependencies and conflicts defined therein.

If any dependencies are violated, as determined at step 306, then the method of FIG. 3 moves to step 312. Otherwise, if no dependencies are violated, then the method of FIG. 3 moves to step 308. If any conflicts are violated, as determined at step 308, then the method of FIG. 3 moves to step 312. Otherwise, if no conflicts are violated, as determined at step 308, then the method of FIG. 3 moves to step 310.

At step 310, image manager 122 commits the desired image to shared storage 150 as desired image 152, and the method of FIG. 3 ends. Otherwise, if there was any violation, then at step 312, image manager 122 returns an error to the end user, and the method of FIG. 3 ends.

FIG. 4 is a flow diagram of steps carried out by image manager 122 to perform a validation of a desired virtualization software image against the compatibility rules of HCL database 180, according to an embodiment. The method of FIG. 4 begins at step 402, at which image manager 122 creates a list of the firmware and drivers in desired image 152, along with their version numbers. At step 404, image manager 122 selects a host 132 to perform HCL validation against. Steps 406-424 are executed each time a new host is selected at step 404.

At step 406, image manager 122 acquires the hardware inventory of the selected host 132, e.g., from the hardware discovery service running in VM management server 100. At step 408, image manager 112 selects a unique device in the hardware inventory. Steps 410-420 are executed each time a new unique device is selected at step 408.

At step 410, image manager 122 retrieves version details of the desired firmware and drivers from the list of firmware and drivers created at step 402. At step 412, image manager 122 accesses HCL database 180 to retrieve version details of the supported firmware and drivers of the selected device. At step 414, image manager 122 compares the version details of the firmware and drivers retrieved at step 410 to those retrieved at step 412. The version details of the firmware and drivers match if all version details of the firmware and drivers retrieved at step 410 can be found in the version details of the firmware and drivers retrieved at step 412. The version details do not match if a single version detail retrieved at step 410 cannot be found in the version details retrieved at step 412. If the version details match, then the method of FIG. 4 moves to step 416, and image manager 122 marks the selected device as compatible. Otherwise, if the version details do not match, then the method of FIG. 4 moves to step 418, and image manager 122 marks the selected device as incompatible.

At step 420, if there is another unique device in the hardware inventory, then the method of FIG. 4 returns to step 408, at which image manager 122 selects the next unique device in the hardware inventory. Otherwise, if there are no other unique devices in the hardware inventory, then the method of FIG. 4 moves to step 422, at which image manager 122 saves the status for the selected host 132. If any of the devices were marked as incompatible at step 418, then image manager 122 marks the selected host 132 as incompatible. Otherwise, if all the devices in the hardware inventory were marked as compatible at step 416, then image manager 122 marks the selected host 132 as compatible.

At step 424, if HCL validation has not been carried out for all of hosts 132, then the method of FIG. 4 returns to step 404, at which image manager 122 selects the next host 132 for HCL validation. Otherwise, the method of FIG. 4 moves to step 426, at which image manager 122 reads the status of each host 132, and image manager 122 saves the status for cluster 130. If any of hosts 132 of were marked as incompatible at step 422, image manager 122 marks cluster 130 as incompatible. Otherwise, if each host 132 was marked as compatible at step 422, image manager 122 marks cluster 130 as compatible. After step 426, the method of FIG. 4 ends.

Figure 5:
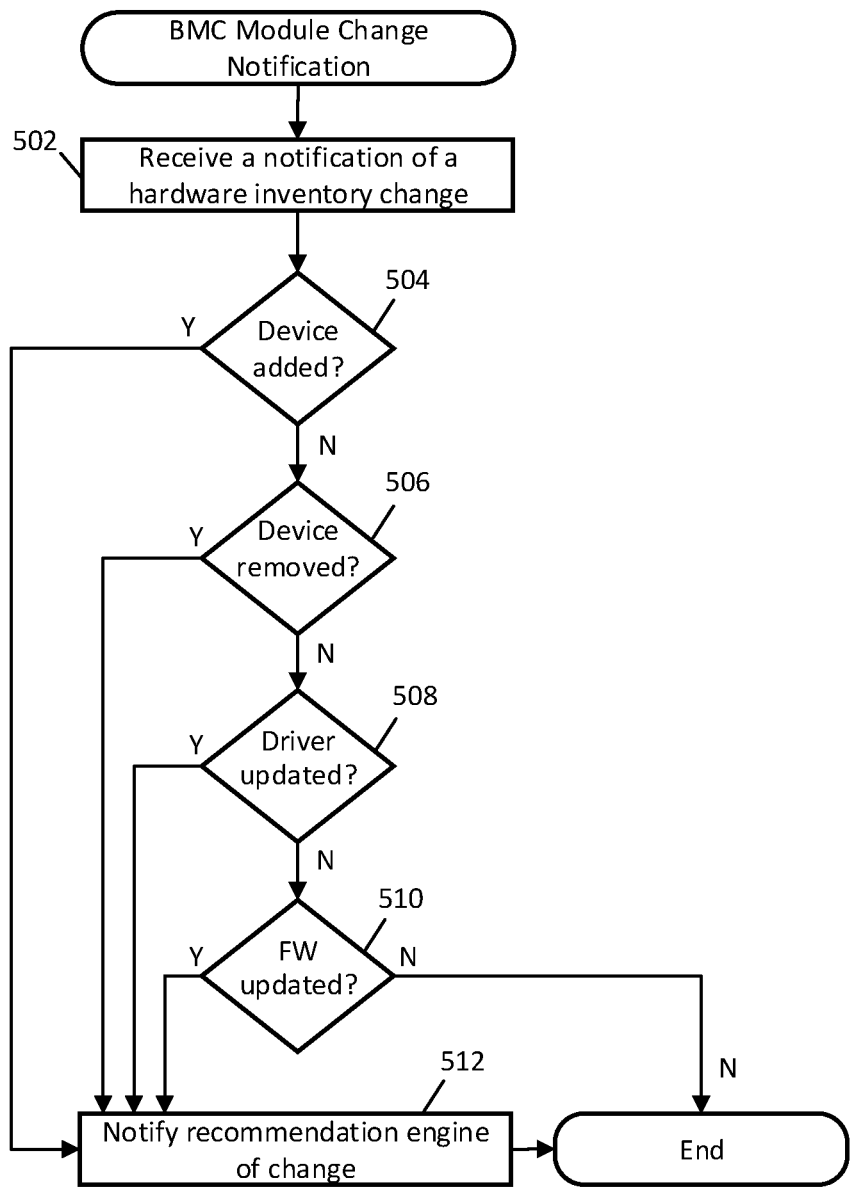
FIG. 5 is a flow diagram of steps carried out by a hardware discovery module to notify a recommendation engine of a change reported by the baseboard management controller module of a host, according to an embodiment.

FIG. 5 is a flow diagram of steps carried out by hardware discovery module 106 to notify recommendation engine 110 of a change reported by the BMC module 142 of a host 132, according to an embodiment. The method of FIG. 5 begins at step 502 when hardware discovery module 106 receives a notification of a hardware inventory change from the BMC module 142 of a host 132.

At step 504, if the notification is for a hardware device being added to host 132, then hardware discovery module 106 executes step 512. Otherwise, step 506 is executed. At step 506, if the notification is for a hardware device being removed from host 132, then hardware discovery module 106 executes step 512. Otherwise, step 508 is executed. At step 508, if the notification is for a driver being updated in host 132, then hardware discovery module 106 executes step 512. Otherwise, step 510 is executed. At step 510, if the notification is for a firmware package being updated in host 132, then hardware discovery module 106 executes step 512. Otherwise, the method of FIG. 5 ends.

At step 512, hardware discovery module 106 notifies recommendation engine 110 of a change event. After step 512, the method of FIG. 5 ends. Upon receipt of the notification, recommendation engine 110 generates an updated virtualization software recommendation, which is described below in conjunction with FIGS. 10-12.

In some embodiments, hardware discovery module 106 may only probe BMC modules 142 for change events concerning specific hardware components. These specific hardware components only include those that may impact the validity of previous recommendations. For example, hardware discovery module 106 may probe for change events concerning HDDs and SSDs, while ignoring change events concerning memory devices. Whether a device can impact previous recommendations is based on compatibility rules stored in HCL database 180. For example, if HCL database 180 contains no compatibility rules for memory devices, then hardware discovery module 106 may ignore change events concerning memory devices. However, if HCL database 180 contains compatibility rules for HDDs, then the addition of an HDD that is incompatible with a previous recommendation invalidates that recommendation.

Figure 6:
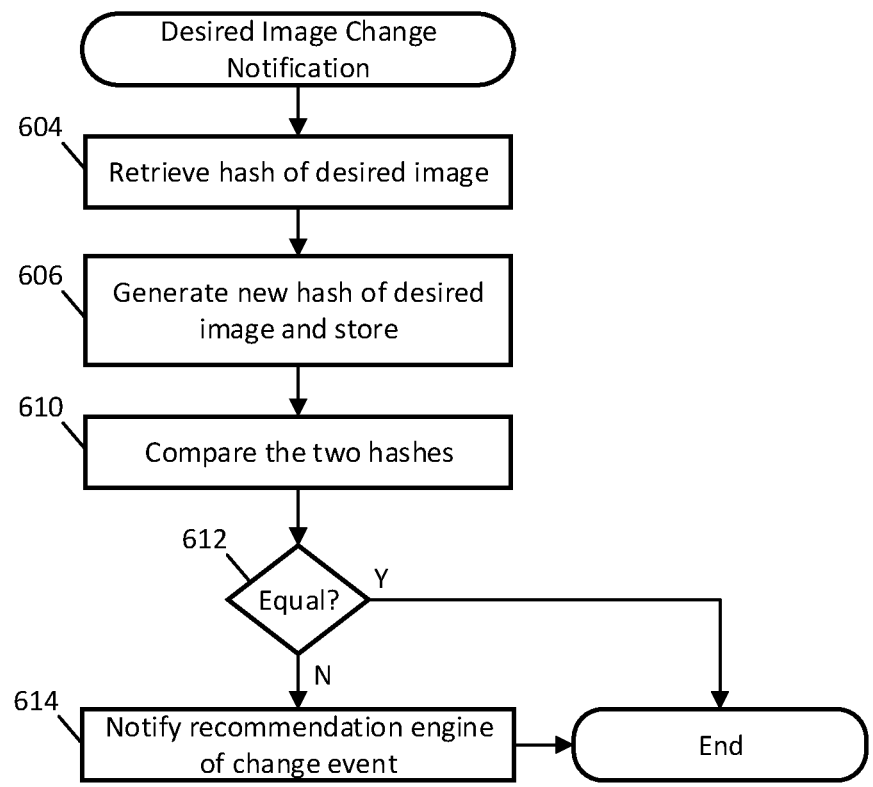
FIG. 6 is a flow diagram of steps carried out by an image manager to notify a recommendation engine of a change to a desired virtualization software image, according to an embodiment.

FIG. 6 is a flow diagram of steps carried out by image manager 122 to notify recommendation engine 110 of changes to desired image 152, according to an embodiment. The method of FIG. 6 is triggered when image manager 122 detects any new commits of desired image 152. A desired image 152 may be newly committed, for example, when software specification 104 is updated as a result of new inputs made by the end user through UI 102.

At step 604, image manager 122 retrieves a previously generated hash of desired image 152 that is stored in shared storage 150. Then, at step 606, image manager 122 generates a new hash from desired image 152 and stores the new hash in shared storage 150.

At step 610, image manager 122 compares the previously generated and new hash values. If image manager 122 determines at step 612 that the hash values are equal, then the method of FIG. 6 ends. Otherwise, image manager 122 at step 614 transmits a notification of a change event to recommendation engine 110, indicating that desired image 152 has changed. After step 614, the method of FIG. 6 ends. In response to the notification, recommendation engine 110 generates an updated virtualization software recommendation, which is described below in conjunction with FIGS. 10-12.

Figure 7:
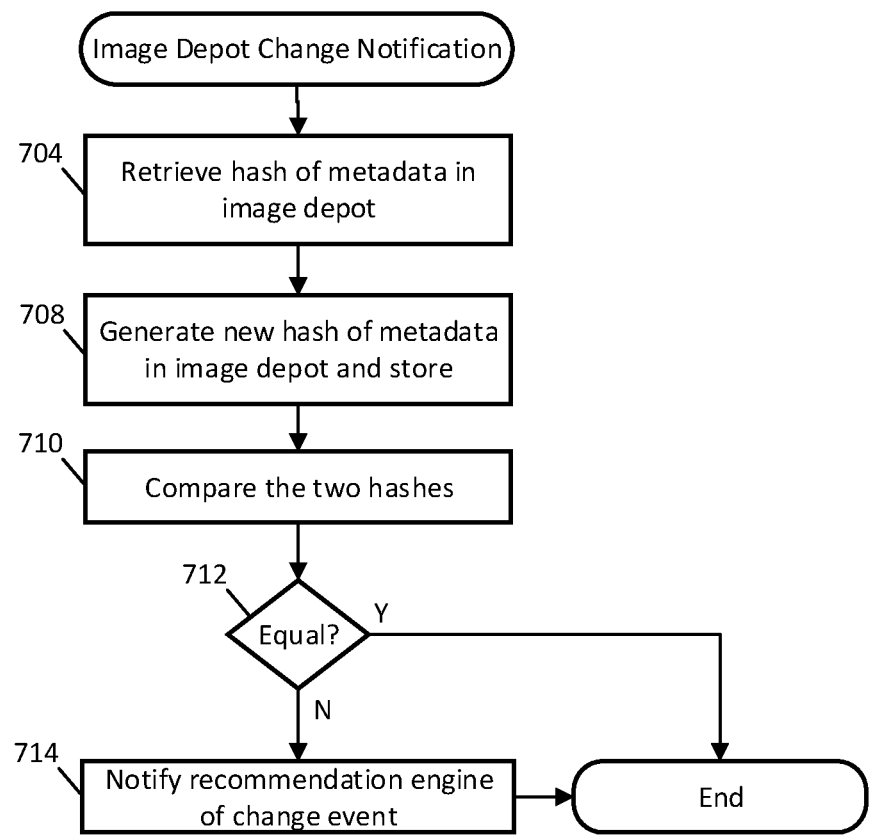
FIG. 7 is a flow diagram of steps carried out by an image manager to notify a recommendation engine of a change to component metadata stored in an image depot, according to an embodiment.

FIG. 7 is a flow diagram of steps carried out by image manager 122 to notify recommendation engine 110 of any changes to metadata of payloads stored in image depot 160, according to an embodiment. The method of FIG. 7 is triggered in response to a content refresh task being performed in image depot 160. The content refresh task may be performed in image depot 160, for example, when new content is published in image depot 160.

At step 704, image manager 122 retrieves a previously generated hash of metadata of payloads stored in image depot 160 from shared storage 150. Then, at step 706, image manager 122 generates a new hash from the metadata of payloads stored in image depot 160 that may have been refreshed as a result of the content refresh task, and stores the new hash in shared storage 150.

At step 710, image manager 122 compares the previously generated and new hash values. If image manager 122 determines at step 712 that the hash values are equal, then the method of FIG. 7 ends. Otherwise, image manager 122 at step 714 transmits a notification of a change event to recommendation engine 110, indicating that the contents of image depot 160 has changed. After step 714, the method of FIG. 7 ends. In response to the notification, recommendation engine 110 generates an updated virtualization software recommendation, which is described below in conjunction with FIGS. 10-12.

Figure 8:
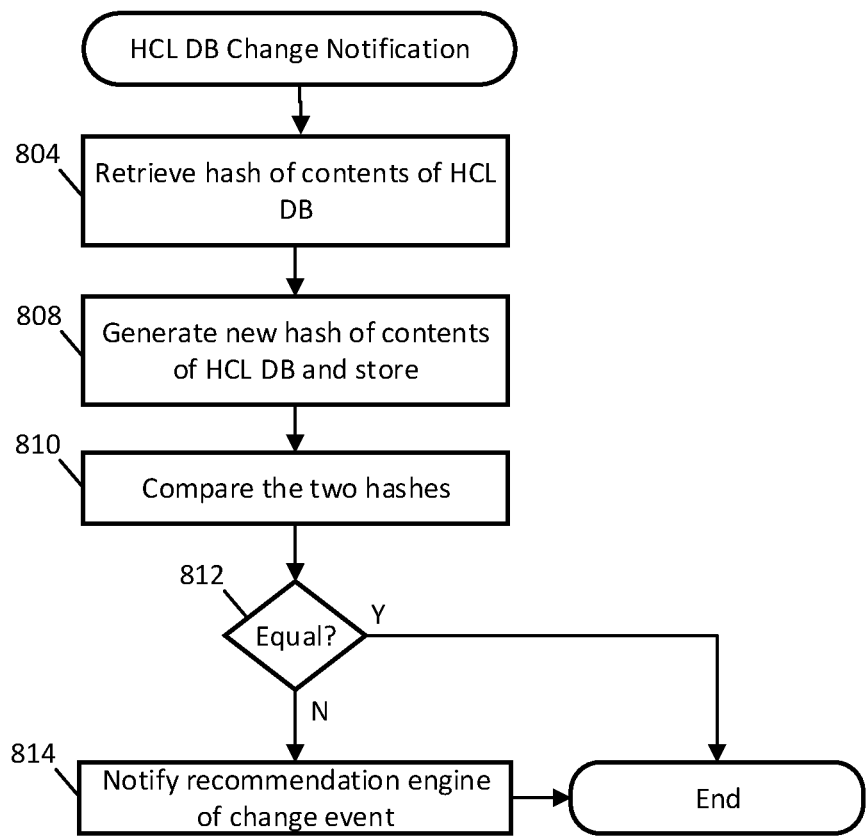
FIG. 8 is a flow diagram of steps carried out by an image manager to notify a recommendation engine of a change to a hardware compatibility database, according to an embodiment.

FIG. 8 is a flow diagram of steps carried out by image manager 122 to notify recommendation engine 110 of any changes to HCL database 180, according to an embodiment. The method of FIG. 8 is triggered in response to a content refresh task being performed in HCL database 180. The content refresh task may be performed in HCL database 180, for example, when new content is stored in HCL database 180.

At step 804, image manager 122 retrieves a previously generated hash of contents of HCL database 180 from shared storage 150. Then, at step 806, image manager 122 generates a new hash from the contents of HCL database 180 that may have been refreshed as a result of the content refresh task, and stores the new hash in shared storage 150.

At step 810, image manager 122 compares the previously generated and new hash values. If image manager 122 determines at step 812 that the hash values are equal, then the method of FIG. 8 ends. Otherwise, image manager 122 at step 814 transmits a notification of a change event to recommendation engine 110, indicating that the contents of HCL database 180 has changed. After step 814, the method of FIG. 8 ends. In response to the notification, recommendation engine 110 generates an updated virtualization software recommendation, which is described below in conjunction with FIGS. 10-12.

Figure 9:
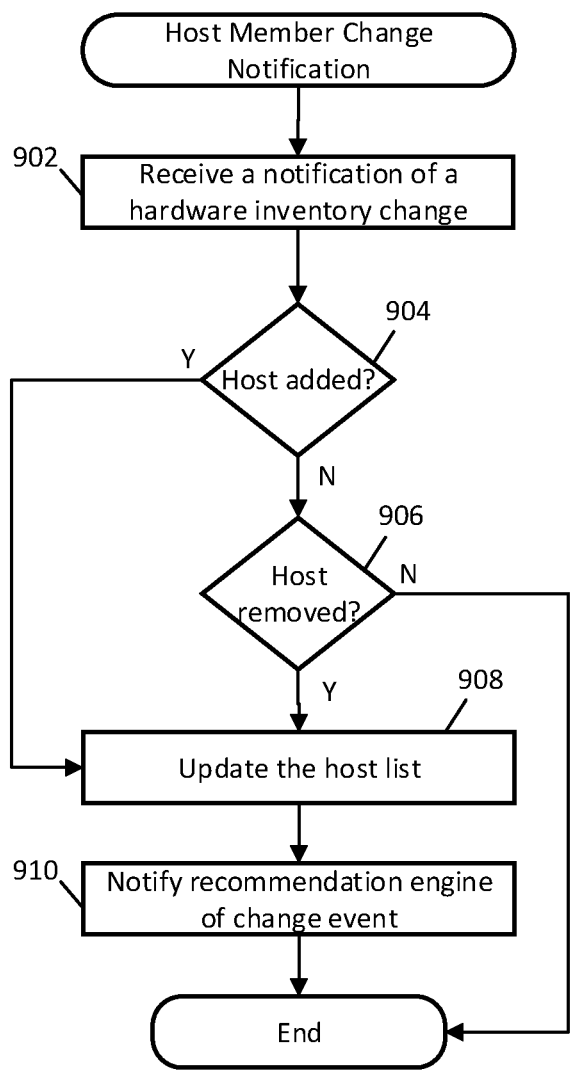
FIG. 9 is a flow diagram of steps carried out by a hardware discovery module to notify a recommendation engine of a change to the host members of a cluster, according to an embodiment.

FIG. 9 is a flow diagram of steps carried out by hardware discovery module 106 to notify recommendation engine 110 of a change to cluster 130, according to an embodiment. The method of FIG. 9 begins at step 902 when hardware discovery module 106 receives a notification of a hardware inventory change.

At step 904, if the notification is for a host being added to cluster 130, then hardware discovery module 106 executes step 908. Otherwise, step 906 is executed. At step 906, if the notification is for a host being removed from cluster 130, then hardware discovery module 106 executes step 908. Otherwise, the method of FIG. 9 ends.

At step 908, hardware discovery module 106 updates host list 108. If a new host is being added to cluster 130, then hardware discovery module 106 adds metadata for the added host to host list 108. If an existing host is being removed from cluster 130, then hardware discovery module 106 removes metadata for the removed host from host list 108.

At step 910, hardware discovery module 106 notifies recommendation engine 110 of a change event. After step 910, the method of FIG. 9 ends. In response to the notification, recommendation engine 110 generates an updated virtualization software recommendation, which is described below in conjunction with FIGS. 10-12.

Figure 10:
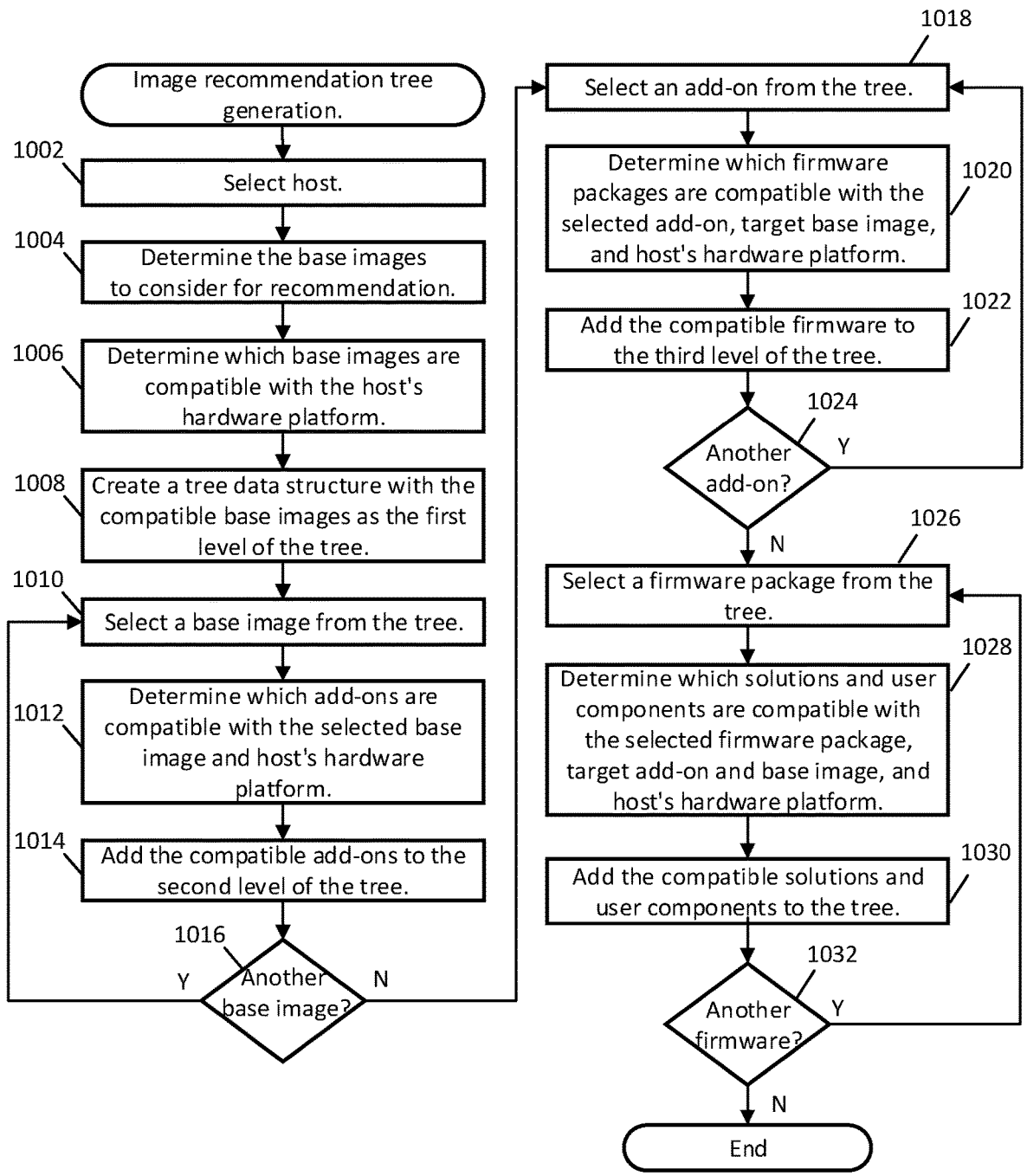
FIG. 10 is a flow diagram of steps carried out by a recommendation engine to generate a tree data structure representing different combinations of base images, add-ons, firmware components, solution components, and user components to be evaluated for possible recommendation, according to an embodiment.

FIG. 10 is a flow diagram of steps carried out by recommendation engine 110 to generate a tree data structure representing different combinations of base images, add-ons, firmware components, solution components, and user components to be evaluated for possible recommendation, according to an embodiment.

At step 1002, recommendation engine 110 selects a host 132 to generate a tree data structure for. At step 1004, base image filter 112 determines which base images available in image depot 160 to consider for recommendation. Base image filter 112 limits itself to base images whose versions are later than or equal to the base image version specified in desired image 152. At step 1006, base image filter 112 performs HCL validation for each base image against the hardware platform of the selected host 132. Base image filter 112 filters out those base images that are determined not to be compatible with the hardware platform.

The HCL validation of the base images is carried out in a similar manner to that described above in conjunction with FIG. 4. However, the image undergoing HCL validation in FIG. 4 is an entire virtualization software image, while images undergoing HCL validation at step 1006 are only base images.

At step 1008, recommendation engine 110 generates a tree data structure with a single level. Each node at this level represents a base image that was determined at step 1006 to be compatible with the hardware platform. The root of the tree points to each base image.

At step 1010, recommendation engine 110 selects one of the base images from the tree. At step 1012, add-on filter 114 determines which add-ons available in image depot 160 are compatible with both the selected base image and the hardware platform. Add-on filter 114 determines whether an add-on is compatible with the selected base image by performing software validation of the add-on against the base image. Add-on filter 114 determines whether an add-on is compatible with the hardware platform by performing HCL validation of the add-on against the hardware platform. Add-on filter 114 filters out those add-ons that are determined not to be compatible with the above-mentioned software and hardware.

The software and HCL validations of the add-ons are carried out in a similar manner to those described above in conjunction with FIGS. 3 and 4. However, the image undergoing software and HCL validation in FIGS. 3 and 4 is an entire virtualization software image, while the images undergoing software and HCL validation at step 1012 are only add-ons. Additionally, unlike in FIG. 3, there is no committing at step 1012.

At step 1014, recommendation engine 110 adds to a second level of the tree: nodes representing add-ons that were determined at step 1012 to be compatible with both the selected base image and the hardware platform. The selected base image in the first level points to each add-on added to the second level.

At step 1016, recommendation engine 110 determines if there is another base image in the tree to find compatible add-ons for. If there is another base image, then the method of FIG. 10 returns to step 1010, at which recommendation engine 110 selects a new base image. Otherwise, if there is not another base image, then the method of FIG. 10 moves to step 1018.

At step 1018, recommendation engine 110 selects one of the add-ons from the tree. At step 1020, firmware filter 116 determines which firmware packages available in image depot 160 are compatible with the selected add-on, the target base image, and the hardware platform. The target base image is the base image pointing to the selected add-on in the tree. Firmware filter 116 determines whether a firmware package is compatible with an add-on and base image by performing software validation of the firmware package against the add-on and base image. Firmware filter 116 determines whether a firmware package is compatible with the hardware platform by performing HCL validation of the firmware package against the hardware platform. Firmware filter 116 filters out those firmware packages that are determined not to be compatible with the above-mentioned software and hardware.

The software and HCL validations of the firmware packages are carried out in a similar manner to those described above in conjunction with FIGS. 3 and 4. However, the image undergoing software and HCL validation in FIGS. 3 and 4 is an entire virtualization software image, while the images undergoing software and HCL validation at step 1020 are only firmware packages. Additionally, unlike in FIG. 3, there is no committing at step 1020.

At step 1022, recommendation engine 110 adds to a third level of the tree: nodes representing firmware packages that were determined at step 1020 to be compatible. The selected add-on in the second level points to each firmware package added to the third level.

At step 1024, recommendation engine 110 determines if there is another add-on in the tree to find compatible firmware packages for. If there is another add-on, then the method of FIG. 10 returns to step 1018, at which recommendation engine 110 selects a new add-on. Otherwise, if there is not another add-on, then the method of FIG. 10 moves to step 1026.

At step 1026, recommendation engine 110 selects one of the firmware packages from the tree. At step 1028, solution/user component filter 118 determines which solutions and user components available in image depot 160 are compatible with the selected firmware package, the target add-on and base image, and the hardware platform. The target add-on is the add-on pointing to the selected firmware package on the tree. The target base image is the base image pointing to the target add-on on the tree. Solution/user component filter 118 determines whether a solution or user component is compatible with a firmware package, add-on, and base image by performing software validation of the solution or user component against the firmware, add-on, and base image. Solution/user component filter 118 determines whether a solution or user component is compatible with the hardware platform by performing HCL validation of the solution or user component against the hardware platform. Solution/user component filter 118 filters out those solutions and user components that are determined not to be compatible with the above-mentioned software and hardware.

The software and HCL validations of the solutions and user components are carried out in a similar manner to those described above in conjunction with FIGS. 3 and 4. However, the image undergoing software and HCL validation in FIGS. 3 and 4 is an entire virtualization software image, while the images undergoing software and HCL validation at step 1028 are only solutions and user components. Additionally, unlike in FIG. 3, there is no committing at step 1012. Solution/user component filter 118 only considers solutions and user components that the end user has actually selected, as indicated by desired image 152. If the end user has not selected any solutions or user components, then solution/user component filter 118 does not return any solutions or user components at step 1028.

At step 1030, recommendation engine 110 adds to the tree: nodes representing solutions and user components that were determined at step 1028 to be compatible. The solutions and user components form additional levels of the tree, with pointers from each node to the next in a linear fashion. In the embodiment described herein, a complete navigation path from the root to the last node of a path includes: (1) one or more solutions, (2) one or more user components, (3) a combination of solutions and user components, or (4) no solutions or user components.

At step 1032, recommendation engine 110 determines if there is another firmware package in the tree to find compatible solutions and user components for. If there is another firmware package, then the method of FIG. 10 returns to step 1026, at which recommendation engine 110 selects a new firmware package. Otherwise, if there is not another firmware package, then the method of FIG. 10 ends.

Figure 11:
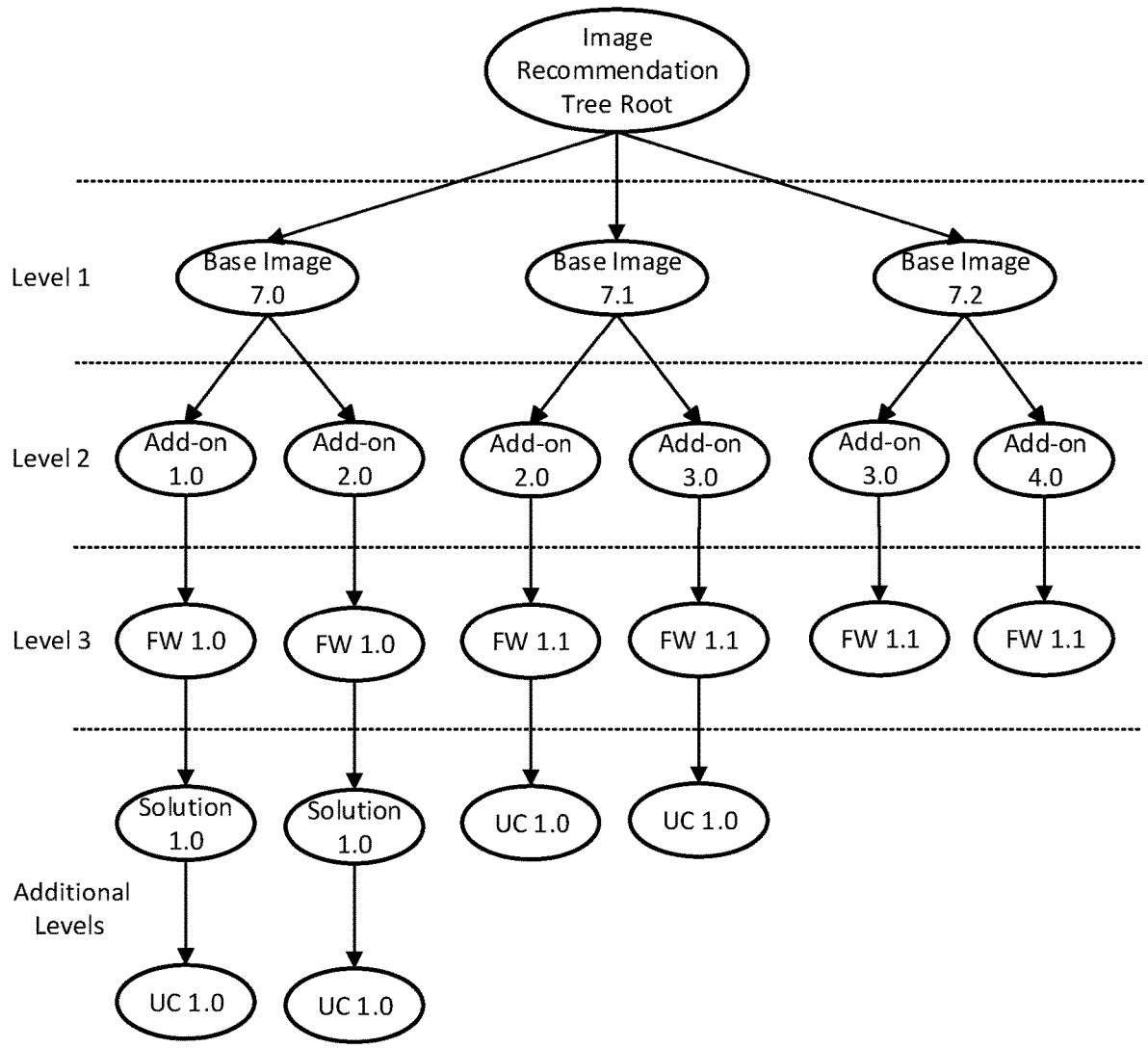
FIG. 11 illustrates an example of a tree data structure that a recommendation engine can traverse to generate complete virtualization software images for a host, according to an embodiment.

An example of an image recommendation tree is illustrated by FIG. 11. Additionally, after generating an image recommendation tree for a host 132, complete image filter 120 can use the image recommendation tree to generate an updated virtualization software recommendation, which is described below in conjunction with FIG. 12.

FIG. 11 illustrates an example of a tree data structure that recommendation engine 110 can traverse to generate complete virtualization software images for a host 132, according to an embodiment. The nodes of the tree represent base images, add-ons, firmware packages, solutions, and user components. Each node in the tree is pointed to by a node in a previous level of the tree, up to the root of the tree.

The first level of the tree consists of base images determined by base image filter 112 to be compatible with the hardware platform of host 132. The second level of the tree consists of add-ons determined by add-on filter 114 to be compatible with both the hardware platform and with the base images pointing to the add-ons. The third level of the tree consists of firmware packages determined by firmware filter 116 to be compatible with the hardware platform and with the base images and add-ons along the path from the root to the firmware packages.

Any additional levels of the tree consist of solutions and user components determined by solution/user component filter 118 to be compatible with the hardware platform and with any other components along the path from the root to the solutions and user components. Solutions and user components are only present in the tree if the end user has actually selected such solutions and user components.

In the example of FIG. 11, later-released software components are always placed to the right of earlier-released software components. For example, Base Image 7.2 is placed to the right of Base Image 7.1 in the first level of the tree. In the example of FIG. 11, recommendation engine 110 can traverse six different navigation paths to generate complete virtualization software images: (1) Base Image 7.0, Add-on 1.0, FW 1.0, Solution 1.0, UC 1.0; (2) Base Image 7.0, Add-on 2.0, FW 1.0, Solution 1.0, UC 1.0; (3) Base Image 7.1, Add-on 2.0, FW 1.1, UC 1.0; (4) Base Image 7.1, Add-on 3.0, FW 1.1, UC 1.0; (5) Base Image 7.2, Add-on 3.0, FW 1.1; and (6) Base Image 7.2, Add-on 4.0, FW 1.1.

Figure 12:
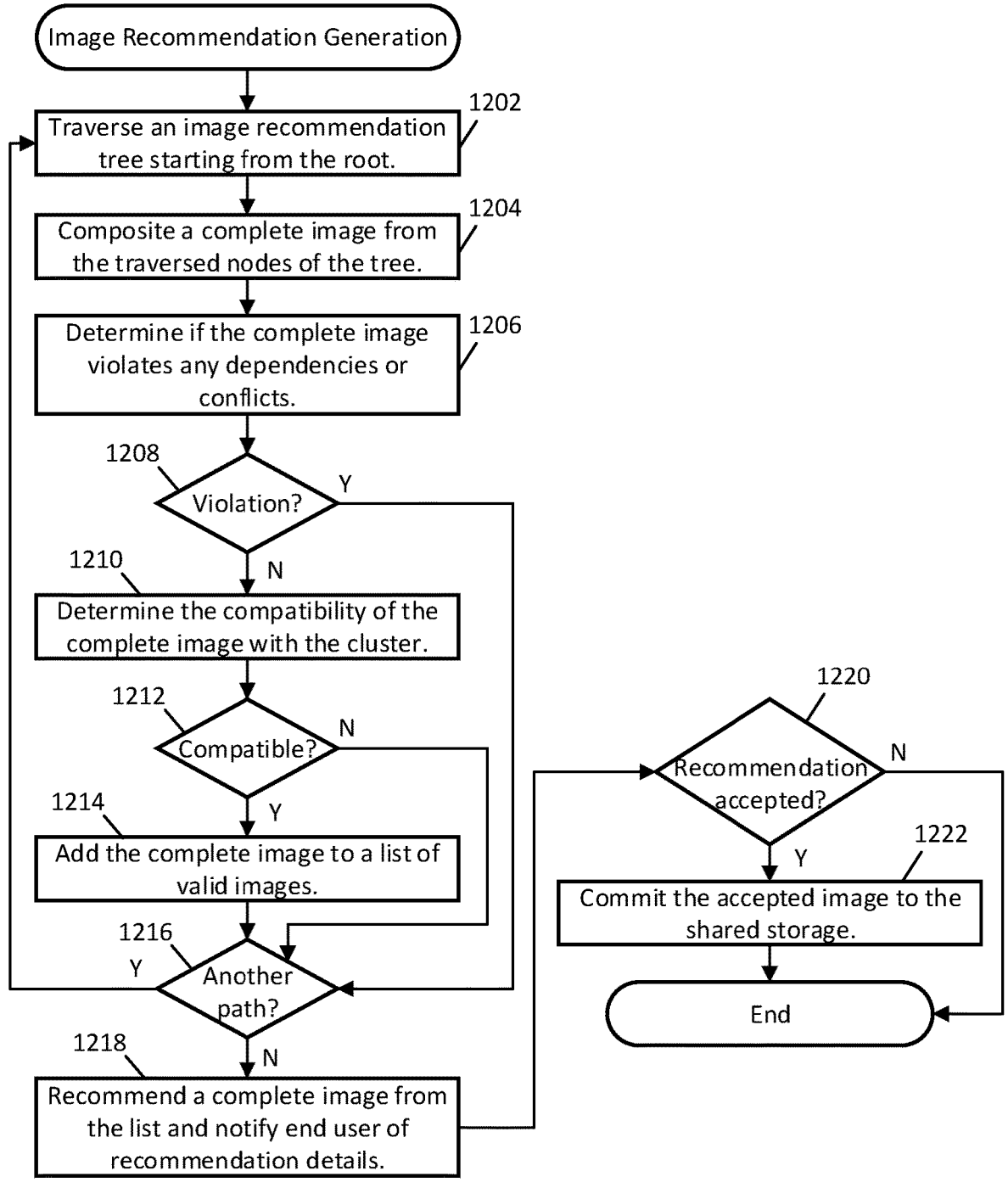
FIG. 12 is a flow diagram of steps carried out by a recommendation engine to generate complete virtualization software images and to recommend images, according to an embodiment.

FIG. 12 is a flow diagram of steps carried out by recommendation engine 110 to generate complete virtualization software images and to recommend images, according to an embodiment. At step 1202, complete image filter 120 traverses through a navigation path of a tree data structure. An example of such a tree illustrated in FIG. 11.

At step 1204, complete image filter 120 composites a complete virtualization software image based on the nodes that are traversed. The composition is carried out in a similar manner to that described above in conjunction with FIG. 2.

At step 1206, complete image filter 120 determines if the composited virtualization software image violates any dependencies or conflicts by performing software validation of the image. Software validation is described above in conjunction with FIG. 3. At step 1208, if there was a violation of a dependency or conflict, then the method of FIG. 12 moves to step 1216. Otherwise, if there were no such violations, then the method of FIG. 12 moves to step 1210.

At step 1210, complete image filter 120 determines if the complete virtualization software image is compatible with the hardware platforms of each host 132 in cluster 130 by performing HCL validation of the image. HCL validation is described above in conjunction with FIG. 4. At step 1212, if the image is not compatible with all hosts 132, then the method of FIG. 12 moves to step 1216. Otherwise, if the image is compatible with all hosts 132, then the method of FIG. 12 moves to step 1214, at which complete image filter 120 adds the complete virtualization software image to a list of valid images to potentially recommend.

At step 1216, complete image filter 120 determines if there are any more navigation paths to traverse in the tree. If there is another path, then the method of FIG. 12 returns to step 1202, at which complete image filter 120 traverses through a new navigation path. Otherwise, if there is not another path, then the method of FIG. 12 moves to step 1218, at which recommendation engine 110 recommends one or more of the complete images from the list of valid images to the end user via UI 102. Recommendation engine 110 also notifies the user of details regarding the recommendation, including: (1) the detected change that triggered the recommendation, (2) the cluster 130 that the recommendation applies to (if there are multiple clusters 130), and (3) when the recommendation of step 1218 was completed.

In one embodiment, recommendation engine 110 selects the right-most navigation path for recommendation. The right-most navigation path contains the combination of the latest available software versions. In another embodiment, recommendation engine 110 selects the right-most navigation path that retains the base image currently installed in hosts 132. In another embodiment, recommendation engine 110 presents both recommendations to the end user.

At step 1220, if the end user accepts a recommended virtualization software image via UI 102, then the method of FIG. 12 moves to step 1222. Otherwise, if the end user rejects the recommended virtualization software image(s), then the method of FIG. 12 ends.

At step 1222, recommendation engine 110 commits the accepted virtualization software image to shared storage 150 as desired image 152. After step 1222, the method of FIG. 12 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of updating a desired state of a virtualization software for installation in a cluster of hosts, wherein the virtualization software includes at least a base image and an add-on image, said method comprising:
   in response to a notification of a change associated with the cluster, determining versions of the base image that have been validated as being compatible with a hardware platform of a first host of the cluster, wherein each compatible version of the base image includes a core kernel component;
   for each compatible version of the base image, determining versions of the add-on image that have been validated as being compatible with the compatible version of the base image and with the hardware platform of the first host;
   presenting, as a recommended image, a complete image of the virtualization software, the complete image containing a first one of the compatible versions of the base image and a first one of the compatible versions of the add-on image; and
   upon acceptance of the recommended image, updating a software specification to include the recommended image, the software specification expressing the desired state of the virtualization software, wherein in response to the software specification being updated to include the recommended image, the first host installs the recommended image thereon.

2. The method of claim 1, wherein the change associated with the cluster is an addition of a hardware device to any host of the cluster or a removal of a hardware device from any host of the cluster.

3. The method of claim 1, wherein the change associated with the cluster is a version update of a driver in any host of the cluster or a version update of firmware in any host of the cluster.

4. The method of claim 1, wherein the change associated with the cluster is a change to the software specification or a change to contents of an image depot, the image depot storing metadata and payloads of different versions of the base image and different versions of the add-on image.

5. The method of claim 1, wherein the change associated with the cluster is a change to the contents of a hardware compatibility database, the hardware compatibility database comprising a list of all hardware devices installed in the cluster and, for each installed hardware device, all versions of device firmware and drivers that are compatible therewith.

6. The method of claim 1, wherein the change associated with the cluster is any host being added to or removed from the cluster.

7. The method of claim 1, further comprising:
   validating the compatible versions of the base image by determining, for each compatible version of the base image, that software components therein are listed by a hardware compatibility database, the hardware compatibility database comprising a list of all hardware devices installed in the cluster and versions of software components compatible with the listed hardware devices; and for each compatible version of the base image, validating the compatible versions of the add-on image by determining, for each compatible version of the add-on image, that there are no software dependencies and conflicts violated with the compatible version of the base image, and that software components therein are listed by the hardware compatibility database.

8. A non-transitory computer readable medium comprising instructions that are executable in a computer system, wherein the instructions when executed cause the computer system to carry out a method of updating a desired state of a virtualization software for installation in a cluster of hosts, wherein the virtualization software includes at least a base image and an add-on image, and wherein said method comprises:

in response to a notification of a change associated with the cluster, determining versions of the base image that have been validated as being compatible with a hardware platform of a first host of the cluster, wherein each compatible version of the base image includes a core kernel component;

for each compatible version of the base image, determining versions of the add-on image that have been validated as being compatible with the compatible version of the base image and with the hardware platform of the first host;

presenting, as a recommended image, a complete image of the virtualization software, the complete image containing a first one of the compatible versions of the base image and a first one of the compatible versions of the add-on image; and upon acceptance of the recommended image, updating a software specification to include the recommended image, the software specification expressing the desired state of the virtualization software, wherein in response to the software specification being updated to include the recommended image, the first host installs the recommended image thereon.

9. The non-transitory computer readable medium of claim 8, wherein the change associated with the cluster is an addition of a hardware device to any host of the cluster or a removal of a hardware device from any host of the cluster.

10. The non-transitory computer readable medium of claim 8, wherein the change associated with the cluster is a version update of a driver in any host of the cluster or a version update of firmware in any host of the cluster.

11. The non-transitory computer readable medium of claim 8, wherein the change associated with the cluster is a change to the software specification or a change to contents of an image depot, the image depot storing metadata and payloads of different versions of the base image and different versions of the add-on image.

12. The non-transitory computer readable medium of claim 8, wherein the change associated with the cluster is a change to the contents of a hardware compatibility database, the hardware compatibility database comprising a list of all hardware devices installed in the cluster and, for each installed hardware device, all versions of device firmware and drivers that are compatible therewith.

13. The non-transitory computer readable medium of claim 8, wherein the change associated with the cluster is any host being added to or removed from the cluster.

14. The non-transitory computer readable medium of claim 8, wherein said method further comprises:

validating the compatible versions of the base image by determining, for each compatible version of the base image, that software components therein are listed by a hardware compatibility database, the hardware compatibility database comprising a list of all hardware devices installed in the cluster and versions of software components compatible with the listed hardware devices; and for each compatible version of the base image, validating the compatible versions of the add-on image by determining, for each compatible version of the add-on image, that there are no software dependencies and conflicts violated with the compatible version of the base image, and that software components therein are listed by the hardware compatibility database.

15. A computer system comprising:

a plurality of physical hosts; and a management server executing instructions to manage the physical hosts as a cluster and to update a desired state of a virtualization software for installation in the physical hosts, wherein the management server is a physical server, and the instructions cause the management server to carry out a method comprising:

in response to a notification of a change associated with the cluster, determining versions of a base image that have been determined as being compatible with a hardware platform of a first physical host of the cluster, wherein each compatible version of the base image includes a core kernel component;

for each compatible version of the base image, determining versions of an add-on image that have been validated as being compatible with the compatible version of the base image and with the hardware platform of the first physical host;

presenting, as a recommended image, a complete image of the virtualization software, the complete image containing a first one of the compatible versions of the base image and a first one of the compatible versions of the add-on image; and upon acceptance of the recommended image, updating a software specification to include the recommended image, the software specification expressing the desired state of the virtualization software, wherein in response to the software specification being updated to include the recommended image, the first physical host installs the recommended image thereon.

16. The computer system of claim 15, wherein the change associated with the cluster is any physical host being added to or removed from the cluster.

17. The computer system of claim 15, wherein the change associated with the cluster is an addition of a hardware device to any physical host of the cluster or a removal of a hardware device from any physical host of the cluster.

18. The computer system of claim 15, wherein the change associated with the cluster is a version update of a driver in any physical host of the cluster or a version update of firmware in any physical host of the cluster.

19. The computer system of claim 15, wherein the change associated with the cluster is a change to the software specification or a change to contents of an image depot, the image depot storing metadata and payloads of different versions of the base image and different versions of the add-on image.

20. The computer system of claim 15, wherein said method further comprises:
   validating the compatible versions of the base image by determining, for each compatible version of the base image, that software components therein are listed by a hardware compatibility database, the hardware compatibility database comprising a list of all hardware devices installed in the cluster and versions of software components compatible with the listed hardware devices; and
   for each compatible version of the base image, validating the compatible versions of the add-on image by determining, for each compatible version of the add-on image, that there are no software dependencies and conflicts violated with the compatible version of the base image, and that software components therein are listed by the hardware compatibility database.

* * * * *